W. B. THORPE.
ELECTROLYTIC DEVICE FOR USE IN ELECTRIC METERS AND OTHER APPARATUS.
APPLICATION FILED AUG. 10, 1914.

1,180,090.　　　　　　　　　　　　　　　　　　Patented Apr. 18, 1916.

Fig. 1.

Fig. 2.

UNITED STATES PATENT OFFICE.

WILFRED BERTRAM THORPE, OF WANDSWORTH COMMON, LONDON, ENGLAND.

ELECTROLYTIC DEVICE FOR USE IN ELECTRIC METERS AND OTHER APPARATUS.

1,180,090.
Specification of Letters Patent. Patented Apr. 18, 1916.
Application filed August 10, 1914. Serial No. 856,041.

*To all whom it may concern:*

Be it known that I, WILFRED BERTRAM THORPE, a subject of the King of Great Britain and Ireland, residing at Wandsworth Common, in the county of London, England, have invented Improvements in Electrolytic Devices for Use in Electric Meters and other Apparatus, of which the following is a specification.

This invention relates to that class of device wherein the evolution of gas electrolytically from a liquid is made use of to bring into operation some means such as a metering train, time relay or switch, and it has for its object to effect certain improvements tending to secure greater reliability.

In meters of the shunted type, that is to say where the current to be measured does not pass through the electrolyte of the metering cell, it is necessary to employ a balancing cell in parallel with the metering cell in order to keep the voltage drop across the metering cell constant otherwise it has been found that, due to a rising back E. M. F., a small percentage variation of voltage resulted in a large error in registration. On the other hand it is extremely difficult to obtain the desired constancy for a considerable period of time owing to the slightest variation in the resistance of any plate destroying the balance.

To overcome such difficulties the present invention consists broadly in combining the cells together, that is to say, confining the electrolyte in two separate regions of the same cell one of which contains an electrode that is common to an eletrode of opposite polarity in each region, there being in the case of an electric meter, a connection between the electrodes of like polarity of both regions with the customary resistance, known as the main shunt, included in one of the supply leads while the common or companion electrode of opposite polarity is connected through a high resistance to the other supply lead. In this way when no load is on, the high resistance in series with the common or companion electrode precludes any but a very minute current flowing therethrough by way of the other electrodes, whereas when a load is present, a current proportional thereto is caused to flow between the common or companion electrode and the electrode in the single electrode region around the main shunt so that the gas evolved in this region can be taken account of for the purpose required, it being understood that the main shunt possesses the characteristic of offering a greater resistance to the flow of current, due to increase of temperature, as the load increases than it does when only a very small current flows through it.

A further feature of the invention consists in causing the gas evolved in the single electrode cell to accumulate to a predetermined quantity and to be thereafter liberated in such wise as to impart movement to a portion of the electrolyte which is made use of to temporarily complete an electric circuit.

The invention can be carried into effect in various ways but in order that the features hereinbefore mentioned and other features may be better understood, one specific example will now be described from which other modifications will be readily ascertainable.

In the accompanying drawings, Figure 1 is a front elevation of a portion of a meter showing the arrangement and construction of the parts of this example. Fig. 2 is a diagram thereof.

As here shown $a$ is a tubular member of glass or other suitable material in the upper end of which the gases evolved can be ignited for recombination to replenish the electrolyte, the lower end of the tubular member having a cathode in the form of a plate $b$ between two anode plates $c$, $d$. A tube $e$ of smaller cross sectional area (hereinafter called for distinction a trap tube) formed with a loop $f$ intermediate of its length, is connected at one end by a tubular connection $g$ to the larger tubular member $a$, near the bottom of the latter and communicates at its upper end with the gas space of the member $a$.

$h$ is a contact or wire, in the path of the tube $e$, in connection with an electromagnetic device exemplified as a coil $i$, for operating recording mechanism, a switch or other desired device.

The trap tube $e$ contains an anode $j$ (hereinafter called the registering anode) which is very much smaller in surface area than the anode arrangement $c$, $d$ in the main tubular member $a$, which may in some cases be say a hundred times as large as the area of the registering anode $j$. The two tubes $a$, $e$ and the connecting tube $g$ are charged with a suitable electrolyte, for example a weak solution of alkali. The main shunt, which may be a wire such as of platinoid, manganin or the like having the requisite cross-sectional area to take the current required, being situated at the back of the meter is not shown in Fig. 1 but is indicated at $k$ in Fig. 2. The registering anode $j$ may be of iron or steel and is connected, conveniently through an adjustable resistance $m$, to the supply side of the main shunt $k$, while of the two anode plates $c$, $d$, one $c$, is directly connected to the line on the consumer's side of the said main shunt $k$ without resistance, while the other $d$, is conveniently connected through an adjustable resistance $n$ to a point in the main shunt $k$ which can be varied, shown in Fig. 2 as approximately at the center of the resistance. The plates $c$, $d$ may be of nickel and equal in size. Assuming the circuit to be one of 100 volts as mentioned, then the resistance connecting the cathode $b$ to the negative supply lead may have a resistance for example of about say 56,000 ohms. The oxygen and hydrogen formed as the result of the electrolytic action taking place when the apparatus is in use are recombined to form water in any desired way. Conveniently this may be done by means of platinum in a spongy state deposited on a pumice stone or asbestos support in the upper part of the tubular chamber $a$, or equivalently, although it may be done by an electric spark. In the example, a screw cap $o$ is shown as carrying a tubular support $p$ of inert material coated with palladium or platinum. When the consumption circuit is not in use, any gases evolved will be practically confined to the main tubular member $a$ and will be recombined in the upper part of such tubular member by the means provided for the purpose.

$o^1$ is a safety cap, for example of rubber, detachably secured over a tubular stem on the cap $o$ and serving to prevent any undue gas pressure being set up in the apparatus at any time.

When the consumption circuit is in use, gas will be evolved in the tube $e$, gradually collecting in the trap portion $f$ and displacing the superincumbent electrolyte into the member $a$ until, when the gas gets around the lower bend of the trap, owing to the rapidly reducing weight of the column of electrolyte aforesaid, the head of liquid in the member $a$ rapidly forces the gas in the trap and with it the column of electrolyte, over into the gas zone in the upper part of the member $a$ the electrolyte in this rush encountering the contact $h$ and momentarily completing the circuit of the coil $i$ or equivalent. The gas from the tube $e$ and the gas from the cathode $b$ in the other tubular member $a$ being thus mixed are recombined as described. The cubical capacity of the loop $f$ and the value of the resistance $m$ are made such that with any given voltage supply, the loop $f$ will become filled with gas to the required extent to pass around the lower bend $f^1$ of the loop and escape through the upper part of the tube $e$ into the tube $a$ for each unit, or each desired part of a unit, or number of units of current supplied, or at any desired intervals of time.

The lower ends of the tubes $a$, $e$ are preferably sealed by fusing.

The contact $h$ extends through a chamber $e^1$ forming an extension of the tube $e$. As the interior of this chamber becomes moist, there is or may be a tendency for current to leak over its inner surface from the electrolyte in the tube $e$ to the opposite pole, namely the negative pole in the example, through the contact $h$ and the winding of the electro-magnetic device $i$, which is of comparatively low resistance, and cause the registering anode $j$ to gas. To avoid this without employing a chamber $e^1$ of undue height and complication, the contact wire $h$ pertaining to the circuit of the electro-magnetic device may be passed through a depending glass tube or rod $r$ around which is wrapped a strip $s$ of metal, preferably nickel, connected direct to the anode or positive pole.

The action of the cell will be readily understood from Fig. 2. Thus, when connected across the mains, without the consumption circuit being closed, the main shunt $k$ does not act as an appreciable resistance and under the impressed voltage there are three paths for the current to take, viz., through electrodes $c$, $d$ and $j$. Since the electrode $j$, as already stated, consists in this case of iron or steel, is small in proportion to the other nickel plates $c$, $d$ and has in itself a higher E. M. F. than nickel, it takes practically none of the current, notwithstanding that at no load it is connected to the same part of the main circuit as the main electrode $c$, $d$, this being furthermore insured by the fact that the electrolyte in the small tube $e$ which contains the electrode $j$ is equivalent to a high resistance.
The electrodes $c$, $d$ consequently divide the balance between them, $c$ taking more than $d$ owing to its having no resistance in series with it but when the consumption circuit is in use the main shunt $k$ acts more effectively as a resistance and therefore current is shunted through the registering electrode $j$, the difference of potential between the two ends of the main shunt increasing with increase in the current. By adjusting first the size of the plates $c$, $d$, $j$; adjusting the resistance $n$ and connecting the plate $d$ to the right position along the main shunt $k$, such registering electrode $j$ can be made to take the current in proportion to the current flowing in the shunt $k$. The increasing of resistance $n$ has the effect of increasing the current shunted through the registering anode $j$ with low loads and conversely the connecting of the electrode $d$ nearer to the supply end of the main shunt $k$ has the effect of decreasing the current shunted through the registering anode $j$ with high loads and conversely. Thus any adjustment can be easily and quickly obtained.

In some cases the two electrode arrangements $j$ and $c$, $d$ may be cathodes and be connected to the opposite ends of a main shunt resistance in the negative supply main the remaining electrode $b$ being an anode connected through the high resistance $b^1$ to the positive supply main.

The ratio between the sizes of the registering anode and the opposite anode or anodes can be varied to suit the rate at which it is desired that the electrolytic cell shall work. In some cases, as in the case of a time switch, the two anodes may be connected to one of the supply mains without any special resistance being inserted in such main between the points of attachment thereto of the anodes and a resistance, adjustable or not, be inserted between the supply main and each anode.

The trap tube and its electrode may, in some cases, be arranged within the other tubular member.

What I claim is:—

1. An electrolytic device of the kind referred to comprising a cell having two separate regions containing electrolyte, an electrode of like polarity in each such region, an electrode in one region, common to the electrodes aforesaid and of opposite polarity thereto and a connection permitting upward flow of the electrolyte in the single electrode region and passage thereof into the other electrode region.

2. An electrolytic device of the kind referred to comprising a cell having two separate regions containing electrolyte and a gas-trapping connection between such regions.

3. An electrolytic device of the kind referred to, comprising a cell having two separate regions containing electrolyte, a gas trapping connection between such regions and circuit closing means whereby an electric circuit can be closed by movement of electrolyte through said connection.

4. An electrolytic device of the kind referred to, comprising a cell having two separate regions containing electrolyte, a registering electrode in one region, a pair of electrodes of dissimilar polarity in the other region, and a tube with gas trap connecting the upper ends of the two regions.

5. An electrolytic device of the kind referred to, comprising a cell having two separate regions containing electrolyte, a registering electrode in one region, a pair of electrodes of dissimilar polarity in the other region, and a tube with gas trap connecting the upper ends of the two regions, the registering electrode in one region having a much smaller area than the electrode of the same polarity in the other region.

6. An electrolytic device of the kind referred to, comprising a cell having two separate regions of unequal capacity containing electrolyte, a registering electrode in the smaller region, a pair of electrodes of dissimilar polarity in the larger region and a similar polarity in the larger region and a connection permitting upward flow of the electrolyte in the smaller region and passage thereof into the larger region.

7. An electrolytic device of the kind referred to, comprising a cell having two separate regions containing electrolyte, a registering electrode in one such region, a pair of plates spaced apart in the other region and constituting an electrode of similar polarity to the electrode in the first named region, and an electrode of opposite polarity to that of the electrodes in both regions, disposed between the said spaced plates.

8. An electrolytic device of the kind referred to, comprising a cell having two separate regions containing electrolyte, a registering electrode in one such region, an electrode plate of like polarity in the other region, a shunt resistance connecting the electrode plate to the registering electrode, a second electrode plate companion to and of the same polarity as the aforesaid electrode plate and adapted to be connected to the resistance intermediate of its length, and an electrode of opposite polarity to the registering electrode located in the same region as the electrode plates.

9. An electrolytic device of the kind referred to, comprising a cell having two separate regions containing electrolyte, a registering electrode in one such region, an electrode plate of like polarity in the other region, a shunt resistance connecting the electrode plate to the registering electrode, a second electrode plate companion to and of the same polarity as the aforesaid electrode plate, an adjustable resistance connecting the second electrode plate to the shunt resistance and an electrode of opposite polarity to the registering electrode located in the same region as the electrode plates.

10. An electrolytic device of the kind referred to, comprising a cell having two separate regions containing electrolyte, a registering electrode in one such region, a non-registering electrode of the same polarity in the other region, resistances separately connecting the said electrodes to one pole of an electric supply system, an electrode of opposite polarity to both of said electrodes and disposed in the region containing the non-registering electrode, and a resistance connecting the said electrode of opposite polarity to the other pole of the electric supply system.

11. An electrolytic device of the kind referred to, comprising a cell having two separate regions containing electrolyte, a tubular connection between the upper ends of such regions, a gas trap in such connection and a circuit contact between such trap and one of the separated regions of the cell, the arrangement being such that gas evolved from the electrolyte in one isolated region is trapped until a predetermined quantity has collected after which it is automatically liberated and caused to rapidly displace electrolyte momentarily into engagement with the said circuit contact.

12. In an electrolytic device of the kind referred to, a cell comprising two separate regions containing electrolyte, a registering electrode in one region, electrodes of dissimilar polarity in the other region, a contact between which and electrolyte in the region containing the registering electrode, a circuit is adapted to be completed with electrolyte displacement, and means comprising an insulated support for the contact and a strip of metal wound around the said support, adapted to be connected to the same pole of the source of supply as that to which the registering electrode is connected and thus oppose leakage of current from the latter to the contact.

Signed at London, England, this 23rd day of July, 1914.

WILFRED BERTRAM THORPE.

Witnesses:
H. D. JAMESON,
P. MILLERAND.

Copies of this patent may be obtained for five cents each, by addressing the "Commissioner of Patents, Washington, D. C."